June 20, 1967 — G. R. RILEY — 3,326,514
FLUID VALVE
Filed July 21, 1964
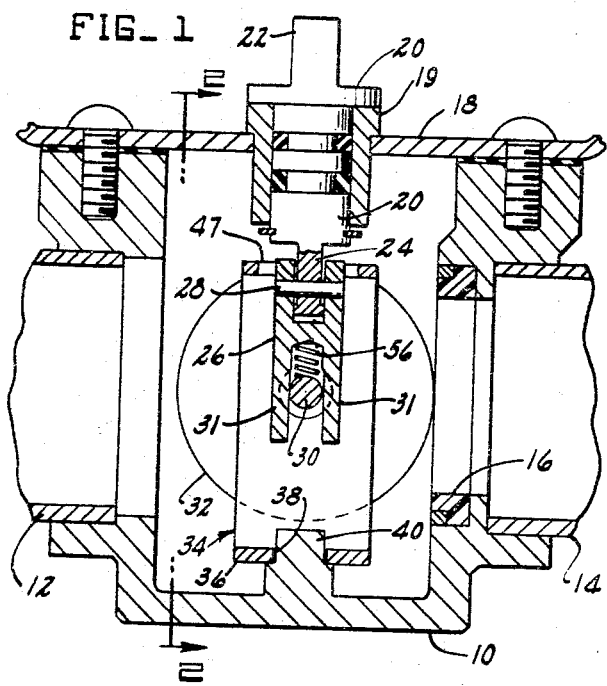
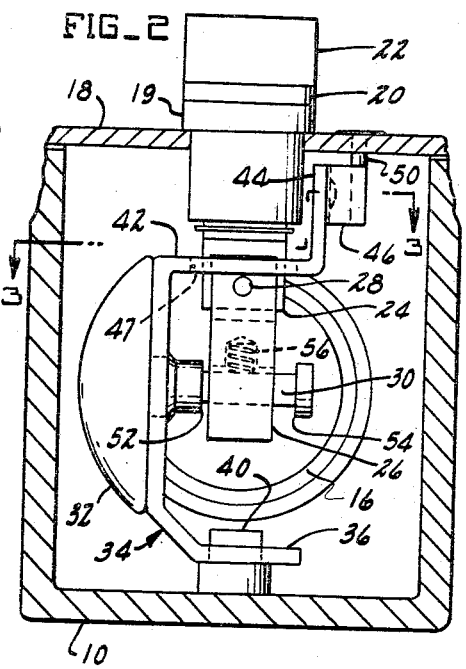
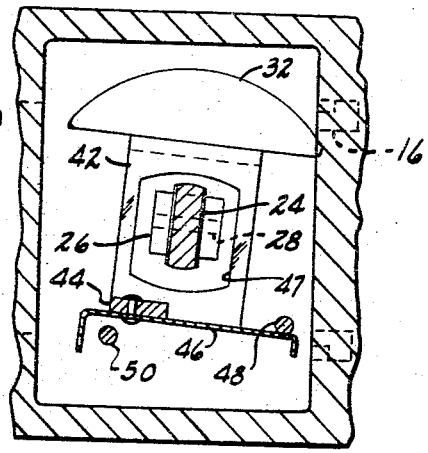
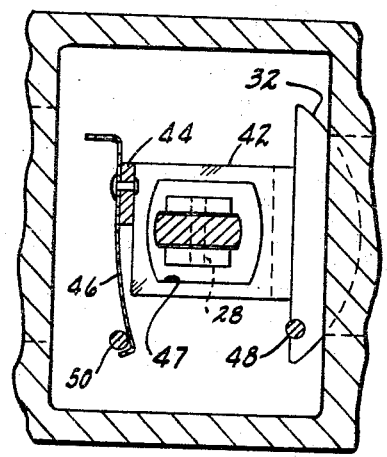
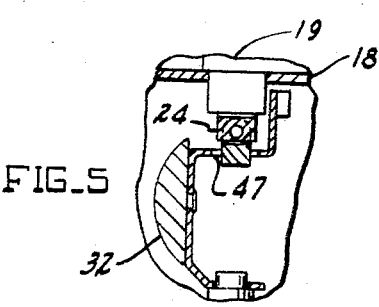
INVENTOR
GEORGE R. RILEY
JOHN E. McRAE
ATTORNEY 3,326,514
FLUID VALVE
George R. Riley, Grove City, Ohio, assignor, by mesne assignments, to American Radiator & Standard Sanitary Corporation, New York, N.Y., a corporation of Delaware
Filed July 21, 1964, Ser. No. 384,147
3 Claims. (Cl. 251—87)

This invention relates to fluid valves, and particularly to means for promoting a tight seal between the valve element and its cooperating seat. The invention is particularly applicable to motor-operated ball valves wherein a spherically contoured valve element is driven back and forth across an annular valve seat.

One object of the invention is to provide a fluid valve wherein a complex motion valve element can be driven by a relatively light operator without appreciable frictional resistance in the drive connection.

A further object is to provide a fluid valve wherein the valve element is positively biased into tight sealing engagement with the valve seat, thereby permitting the valve to be used with low fluid supply pressures in the neighborhood of one or two p.s.i.

Other objects of this invention will appear from the following description and appended claims, reference being had to the accompanying drawings forming a part of this specification wherein like reference characters designate corresponding parts in the several views.

In the drawings:

FIGURE 1 is a longitudinal sectional view taken through a fluid valve constituting one embodiment of the invention;

FIG. 2 is a sectional view taken substantially on line 2—2 in FIG. 1;

FIG. 3 is a sectional view taken substantially on line 3—3 in FIG. 2;

FIG. 4 is a sectional view taken in the direction of FIG. 3 with the valve element in a closed position; and FIG. 5 is a sectional view taken through a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings there is shown a fluid valve comprising a valve housing or body 10 having a tubular inlet coupling 12, a tubular outlet coupling 14, and a semi-resilient annular valve seat 16 formed for example of polytetrafluoroethylene. Closing the upper end of body 10 is a cover 18 having a tubular sleeve bearing 19 secured thereto for rotatably supporting a rotary stem 20. The upper end portion 22 of stem 20 is non-circular for connection with a driving means (not shown). The driving means may include an electric motor for operating the stem in the valve-opening direction and a spring motor for operating the stem in the valve-closing direction, as shown in U.S. patent application Serial No. 188,383 filed April 18, 1962, now Patent No. 3,248,080, in the name of Emil R. Plasko.

The lower end portion 24 of stem 20 is non-circular and fits between spaced upstanding arms formed on a link element 26. As shown in FIG. 1 a pin extends through the stem and link to mount the link for swinging movement about an axis extending cross-wise of the stem axis. Rotation of the stem is transmitted through link element 26 to a shaft 30 which extends between spaced arms 31 formed on the link element. Shaft 30 is rigidly affixed to or integral with a spherically-surfaced valve element 32 which is staked or otherwise secured to a strap-type bracket 34. The side surfaces of shaft 30 constitute driver surfaces for transmitting the drive from link element 26 to valve element 32.

As shown best in FIG. 2, valve element bracket 34 comprises a laterally turned lower portion 36 which has a circular aperture 38 for semi-loosely mounting the bracket on the upstanding bearing or post 40; in one instance a post-aperture clearance of about .013 inch was found to provide suitable semi-loose mounting for the bracket. The bracket includes an upper laterally turned portion 42 having an upturned end 44 which mounts a leaf spring 46. An enlarged opening 47 is formed in bracket portion 42 so that the bracket is precluded from direct engagement with stem 20 or link 26.

Depending from cover 18 are two vertical abutments in the form of pins 48 and 50. In the valve-open position of FIGS. 2 and 3 pin 48 or 50 may engage spring 46 to preclude undesired counterclockwise turning of the valve element beyond its illustrated position. The assembly of element 32 and bracket 34 is semi-loosely retained against displacement from post 40 by the disposition of link 26 between the opposed shoulders 52 and 54 formed on shaft 30. A light compression spring 56 may also be utilized for retaining purposes, particularly when the valve is used in an upside down position.

Assuming the valve is in the valve-open condition of FIGS. 2 and 3, a clockwise force applied to the upper end of stem 20 will cause spherical valve element 32 to rotate about the vertical axis defined by post 40 and stem 20. As the valve element rotates it moves across the annular valve seat 16 toward the seat-registering position of FIG. 4. During the major portion of this movement the valve element and its mounting bracket 34 retains the desired loose disposition on post 40, and the valve element therefore has minimum frictional engagement with the edge of seat 16 as it crosses same.

As valve element 32 comes into registry with seat 16 its leaf spring 46 contacts pin 50. The leaf spring thereby applies a biasing force onto bracket 34 for urging valve element 32 into tight sealing engagement with seat 16. The seal is effective irrespective of the fluid supply pressure. Hence the valve can be used where the pressure is very low, as for example one or two p.s.i.

During the period when spring 46 is applying a biasing force on bracket 34 the bracket and attached valve element enjoy a shifting or rocking motion in a vertical plane. The lower bracket portion 36 has a slight clearance on post 40 which prevents binding and which permits the lower area of the spherical valve element to shift toward seat 16 along with the upper area of the valve element.

It will be noted from FIG. 4 that the biasing force of spring 46 acts at an angle to the direction taken by the valve element as it moves into tight sealing engagement with seat 16. If link 26 were rigidly affixed to stem 20 the angular difference between the force and the movement would tend to set up a frictional drag between the link and shaft 30. However the link is pivotally carried on stem 20 so as to move with shaft 30 and freely about the axis of pin 28. Link 26 constitutes an anti-friction means between stem 16 and valve element shaft 30 for eliminating frictional forces which would otherwise exist between the stem and valve element during the biasing movement. The arc taken by link 26 about pin 28 is not materially different from the path taken by bracket 34 during the short distance biasing movement. Therefore the link does not interfer with the biasing movement.

Reverse rotation of stem 20 allows leaf spring 46 to unload from pin 50 and effect free movement of valve element 32 to its FIG. 3 fully-open position. The valve-opening movement can be provided by a relatively small electric motor, and the valve-closing movement can be provided by a light clock spring as shown in aforementioned patent application, Serial No. 188,383.

FIG. 5 illustrates a simplified embodiment of the invention wherein link 26 drives the valve element by direct engagement with bracket 34. In this form of the invention bracket aperture 47 is sized so that its side edges lie closely alongside the outer side surfaces of link 26. The link is thus able to transmit the drive to the bracket while permitting the desired biasing movement of the valve element into tight sealing engagement with seat 16.

What is claimed:

1. A fluid valve comprising a housing having an annular valve seat; a rotary stem extending into the housing on an axis crosswise of the valve seat axis; a pivot bearing disposed in the housing in axial alignment with the stem; a link swingably connected with said stem for rotary movement around an axis normal to the stem axis; a one piece valve element comprising a spherically-contoured portion arranged to move into and out of engagement with the seat, a mounting portion rotatably engaging the pivot bearing, and a driver portion engaging the link; said link having a free end portion which slidably moves along a surface of the valve element driver portion in a plane normal to the link rotary movement axis; whereby rotation of the stem causes the link to turn the valve element about the stem axis while permitting the element to enjoy a shifting movement in a plane normal to the axis of rotation of the link.

2. In a fluid valve comprising a valve seat, a valve element floatably arranged for arcuate movement across the seat, a rotary stem for effecting such movement, a fixed abutment, and spring means carried by the valve element to contact the abutment as the valve element moves into registry with the seat whereby to apply a force on the valve element for biasing same into tight sealing engagement with the seat: the improvement comprising a link swingably connected with the stem for rotary movement about an axis normal to the stem axis, and driver means rigidly carried by the valve element in force-transmitting engagement with the link; said link having a free end portion which slidably moves along a surface of the valve element driver means in a plan normal to the link swing axis; whereby during the biasing movement the link and driver means shift together in a plane normal to the swing axis for the link.

3. A fluid valve comprising an upwardly opening housing having an annular valve seat in an inner side surface thereof; a cover closing the upper opening in the housing; a rotary stem projecting through the cover downwardly into the housing interior; a stationary pivot bearing located within a lower portion of the housing in alignment with the stem; a link swingably suspended from the stem for movement about an axis extending normal to the stem axis; a valve element comprising a mounting portion rotatably engaging the pivot bearing, a driver portion having surfaces thereof engaged with the link for receiving a driving force therefrom, and a spherically-contoured sealing portion arranged to move horizontally across the annular seat during rotation of the stem; an abutment depending from the cover; and a leaf spring carried by the valve element in horizontal registry with the abutment; said link having a free end portion which slidably moves along the aforementioned driver portion surfaces in a plane normal to the link swing axis; whereby movement of the valve element to a position registering with the seat causes the leaf spring to contact the abutment, whereupon the spring applies a biasing force to the valve element urging same into tight sealing engagement with the seat.

References Cited

UNITED STATES PATENTS

| | | | |
|---|---|---|---|
| 743,356 | 11/1903 | Watters | 251—182 |
| 3,042,358 | 7/1962 | Anderson | 251—177 |
| 3,248,080 | 4/1966 | Plasko | 251—185 |

WILLIAM F. O'DEA, *Primary Examiner.*
HAROLD WEAKLEY, *Examiner.*